US012762995B2

(12) United States Patent
Kim

(10) Patent No.: US 12,762,995 B2
(45) Date of Patent: Oct. 13, 2026

(54) IMAGE DISPLAY DEVICE AND METHOD FOR CONTROLLING THE SAME

(71) Applicant: LG ELECTRONICS INC., Seoul (KR)

(72) Inventor: Sehwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/204,247

(22) Filed: May 9, 2025

(65) Prior Publication Data

US 2025/0391315 A1 Dec. 25, 2025

(30) Foreign Application Priority Data

Jun. 21, 2024 (KR) ........................ 10-2024-0081283

(51) Int. Cl.
*G09G 3/20* (2006.01)

(52) U.S. Cl.
CPC ..... *G09G 3/2096* (2013.01); *G09G 2330/023* (2013.01); *G09G 2330/026* (2013.01); *G09G 2354/00* (2013.01); *G09G 2370/22* (2013.01)

(58) Field of Classification Search
CPC ......... G09G 2330/00; G09G 2330/022; G09G 2330/023; G09G 2330/026; G09G 2330/027; G09G 3/2096; G09G 2354/00; G09G 2370/22; G09G 2330/02; G09G 2330/021
See application file for complete search history.

(56) References Cited

U.S. PATENT DOCUMENTS

| | | | | |
|---|---|---|---|---|
| 7,934,106 | B2 | 4/2011 | Ninomiya et al. | |
| 2018/0048848 | A1* | 2/2018 | Park ................. | H04N 21/44231 |
| 2019/0074985 | A1 | 3/2019 | Higuchi | |
| 2022/0217436 | A1* | 7/2022 | Lee .................... | H04N 21/4432 |

FOREIGN PATENT DOCUMENTS

| | | | |
|---|---|---|---|
| CN | 112584246 | A | 3/2021 |
| KR | 10-2007-0089413 | A | 8/2007 |
| KR | 10-2008-0064674 | A | 7/2008 |

OTHER PUBLICATIONS

KIPO Office Action 10-2024-0081283, Jan. 5, 2026 (English translation only). (Year: 2026).*

* cited by examiner

*Primary Examiner* — Julie Anne Watko
(74) *Attorney, Agent, or Firm* — Birch, Stewart, Kolasch & Birch, LLP

(57) ABSTRACT

The present disclosure relates to an image display device and a method for controlling the same that enable use of the image display device to be implemented with greater consideration of user convenience. Provided is an image display device including a power supply, a communicator that is in communication with an external device, and a controller that determines whether to activate a power sync function based on whether a predetermined time has elapsed from one reference time point of a time point when alternating current (AC) power supply to the power supply is turned off and then on and a time point when direct current (DC) background power is turned on.

10 Claims, 10 Drawing Sheets

IMAGE DISPLAY DEVICE AND METHOD FOR CONTROLLING THE SAME

Pursuant to 35 U.S.C. § 119 (a), this application claims the benefit of earlier filing date and right of priority to Korean Patent Application No. 10-2024-0081283, filed on Jun. 21, 2024, the contents of which are hereby incorporated by reference herein in their entirety.

BACKGROUND OF THE DISCLOSURE

Field of the Disclosure

The present disclosure relates to an image display device and a method for controlling the same that enable use of the image display device to be implemented in consideration of convenience of a user.

Discussion of the Related Art

An image display device includes, for example, a function for receiving and processing a broadcast image viewable by a user. The image display device displays a broadcast, which is selected by the user from among broadcast signals transmitted from a broadcast station, on a display. Currently broadcasters are transitioning from analog to digital broadcasting.

Digital broadcasting refers to broadcasting of digital video and audio signals. The digital broadcast has low data loss due to robustness against external noise, error correction, high resolution and a high-definition screen, as compared with an analog broadcast. In addition, digital broadcasting can provide a bidirectional service unlike analog broadcasting.

In order to use digital broadcasting including a variety of content, the performance of an image display device has been improved and the function thereof has been diversified. As the performance of the image display device has been improved, various functions of the image display device, such as gaming, music listening or Internet shopping, using various applications can be performed in addition to a function for receiving an image signal from a broadcast station and viewing a broadcast.

As the image display device performs the various functions, the number of image sources that may be reproduced via the image display device is also increasing. A plurality of external devices providing a plurality of image sources may be connected to an external device interface of the image display device in a wired or wireless manner.

When the user wants to reproduce an image source provided by one external device via the image display device, both the external device and the image display device should be turned on. Manually turning on each of the external device and the image display device may cause inconvenience to the user.

SUMMARY OF THE DISCLOSURE

The present disclosure is proposed to solve the aforementioned problem, and is to provide an image display device and a method for controlling the same that, when a user wants to reproduce an image source provided by an external device via the image display device and manually turns on only one of the external device and the image display device, enable the other to be also turned on automatically.

Additional advantages, objects, and features of the disclosure will be set forth in the disclosure herein as well as the accompanying drawings. Such aspects may also be appreciated by those skilled in the art based on the disclosure herein.

To achieve the above purposes, according to one aspect of the present disclosure, provided is an image display device including a power supply, a communicator that is in communication with an external device, and a controller that determines whether to activate a power sync function based on whether a predetermined time has elapsed from one reference time point of a time point when alternating current (AC) power supply to the power supply is turned off and then on and a time point when direct current (DC) background power is turned on.

The controller may control the power sync function to be deactivated until the predetermined time elapses from the reference time point, and control the power sync function to be activated after the predetermined time elapses from the reference time point.

The controller may control DC power of the image display device to be turned on in response to reception of a power sync signal from the external device while the power sync function is activated and the DC power of the image display device is turned off.

The controller may control DC power of the image display device to remain off in response to reception of a power sync signal from the external device while the power sync function is deactivated and the DC power of the image display device is turned off.

The controller may control a background boot notification signal to be transmitted to the external device in response to the DC background power being turned on.

The communicator may be in communication with the external device in a high definition multimedia interface (HDMI) scheme.

The power sync signal may be a consumer electronic control (CEC) signal, and the background boot notification signal may be a hot plug detect (HPD) signal.

The DC background power may be turned on for at least one of internal memory cleanup, OLED element compensation, and broadcast schedule update.

Further, according to one aspect of the present disclosure, provided is a method for controlling an image display device including establishing communication with an external device, and determining whether to activate a power sync function based on whether a predetermined time has elapsed from one reference time point of a time point when alternating current (AC) power supply to a power supply is turned off and then on and a time point when direct current (DC) background power is turned on.

Effects of the image display device and the method for controlling the same according to the present disclosure will be described as follows.

According to at least one of the various aspects of the present disclosure, when the user wants to reproduce the image source provided by the external device via the image display device, and when the user manually turns on only one of the external device and the image display device, the other may also be automatically turned on.

In addition, according to at least one of the various aspects of the present disclosure, the one of the external device and the image display device may be prevented from being unnecessarily automatically turned on in some cases.

Additional scopes of the applicability of the present disclosure will become apparent from the detailed description below. However, because various changes and modifications within the spirit and scope of the present disclosure may be clearly understood by those skilled in the art, it should be understood that the detailed description and specific embodiments such as preferred embodiments of the present disclosure are given only as examples.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The present invention will become more fully understood from the detailed description given herein below and the accompanying drawings, which are given by illustration only, and thus are not limitative of the present invention.

DETAILED DESCRIPTION OF THE DISCLOSURE

Figure 1:
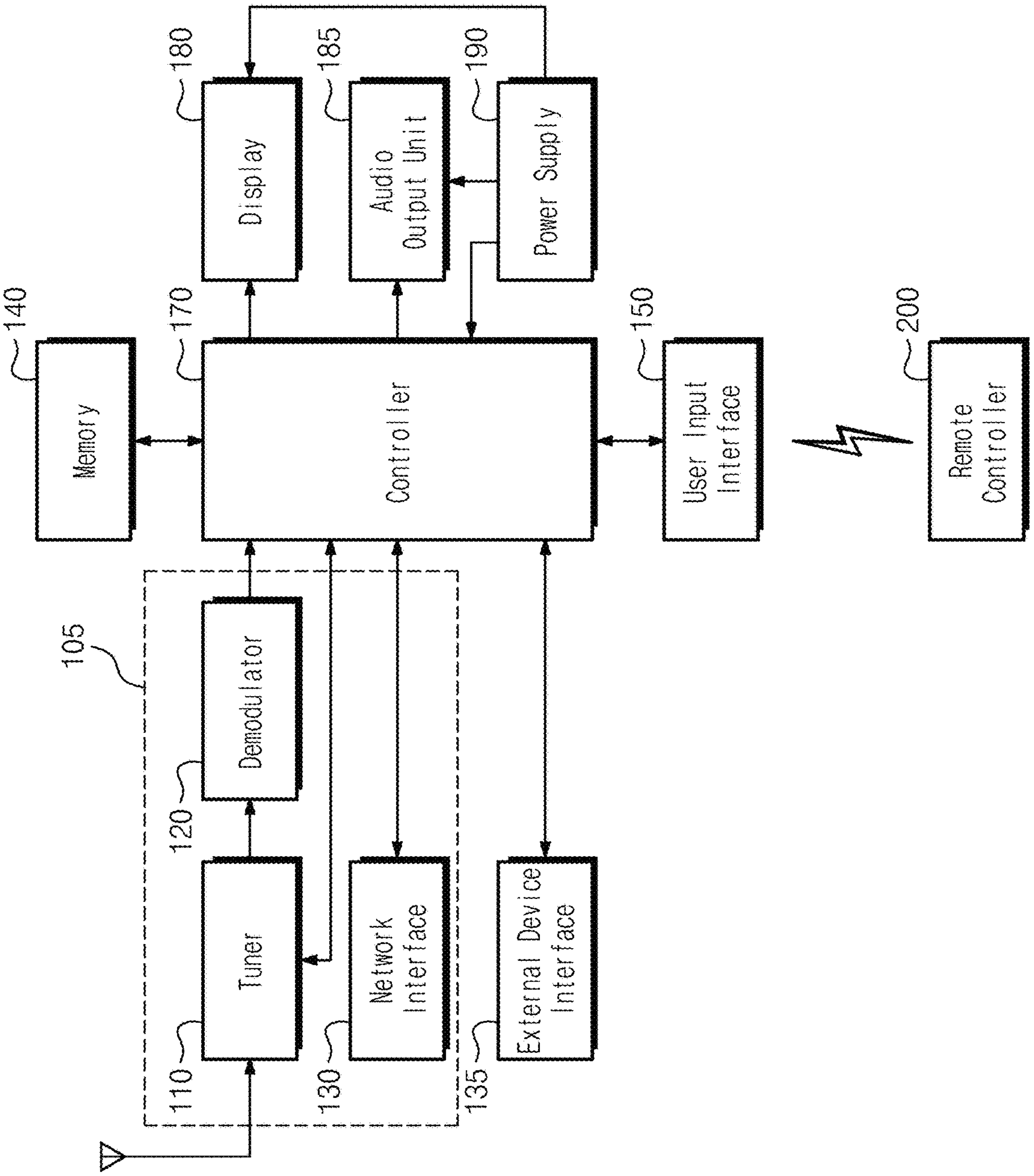
FIG. 1 is a schematic block diagram of an image display device according to one aspect of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The terms "module" and "unit" attached to describe the names of components are used herein to help the understanding of the components and thus should not be considered as having specific meanings or roles. Accordingly, the terms "module" and "unit" may be used interchangeably.

In addition, each of these elements may be configured as a separate individual hardware module or implemented as two or more hardware modules. Two or more elements may be implemented as a single hardware module. In some cases, at least one of these elements may be implemented as software.

An image display device as set forth herein is an intelligent image display device equipped with a computer support function in addition to a broadcast reception function, for example. Since an Internet function is added to a broadcast reception function, the image display device may have user-friendly interfaces such as a handwriting input device, a touchscreen, or a pointing device. Further, because the image display device supports wired or wireless Internet, it is capable of e-mail transmission/reception, Web browsing, banking, gaming, etc. by connecting to the Internet or a computer. To implement these functions, the image display device may operate based on a standard, general-purpose Operating System (OS).

Various applications can be freely added to or deleted from, for example, a general-purpose OS kernel of the image display device according to the present invention. Therefore, the image display device may perform a number of user-friendly functions. The image display device may be a network TV, a Hybrid broadcast broadband TV (HBBTV), a smart TV, etc. for example. The image display device is also applicable to smart phones.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected at the discretion of the applicant. Furthermore, the present invention must be understood, not simply by the actual terms used but by the meanings of each term lying within.

FIG. 1 is a schematic block diagram of an image display device according to one aspect of the present disclosure.

Referring to FIG. 1, an image display device 100 according to another embodiment of the present invention includes a broadcast receiver 105, an external device interface 135, a memory 140, a user input interface 150, a controller 170, a display 180, an audio output unit 185, a power supply 190, and a camera module (not shown). The broadcasting receiver 105 and the external device interface 135 may be collectively referred to as a communicator.

The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal.

More specifically, if the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal Side-Band (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The TS output from the demodulator 120 may be input to the controller 170 and thus subjected to demultiplexing and A/V signal processing. The processed video and audio signals are output to the display 180 and the audio output unit 185, respectively.

The external device interface 135 may serve as an interface between an external device and the image display device 100. For interfacing, the external device interface 135 may include an A/V Input/Output (I/O) unit (not shown) and/or a wireless communication module (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 100.

The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards.

The external device interface 135 may be connected to various set-top boxes through at least one of the above-described ports and may thus perform an I/O operation with the various set-top boxes.

The external device interface 135 may receive applications or an application list from an adjacent external device and provide the applications or the application list to the controller 170 or the memory 140.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display device 100 to a user or electronic device selected from among users or electronic devices pre-registered with the image display device 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VOD, and broadcast signals, and information related to the content from a CP or an NP. Also, the network interface 130 may receive update information about firmware from the NP and update the firmware. The network interface 130 may transmit data over the Internet or to the CP or the NP.

The network interface 130 may selectively receive a desired application among open applications over a network.

In an embodiment of the present invention, when a game application is executed in the image display device, the network interface 130 may transmit data to or receive data from a user terminal connected to the image display device through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel storage function.

The memory 140 may store applications or a list of applications received from the external device interface 135 or the network interface 130.

In an embodiment of the present invention, when the image display device provides a game application, the memory 140 may store user-specific information and game play information of a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or extreme Digital (XD) memory), a Random Access Memory (RAM), or a Read-Only Memory (ROM) such as an Electrically Erasable and Programmable Read Only Memory (EEPROM). The image display device 100 may reproduce content stored in the memory 140 (e.g. video files, still image files, music files, text files, and application files) to the user.

While the memory 140 is shown in FIG. 1 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication.

For example, the user input interface 150 may provide the controller 170 with control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be audibly output through the audio output unit 185. Also, the audio signal processed by the controller 170 may be transmitted to the external output device through the external device interface 135.

While not shown in FIG. 1, the controller 170 may include a DEMUX and a video processor.

In addition, the controller 170 may provide overall control to the image display device 100. For example, the controller 170 may control the tuner 110 to tune to an RF broadcast signal corresponding to a user-selected channel or a pre-stored channel.

The controller 170 may control the image display device 100 according to a user command received through the user input interface 150 or according to an internal program. Especially the controller 170 may access a network and download an application or application list selected by the user to the image display device 100 over the network.

For example, the controller 170 controls the tuner 110 to receive a signal of a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

As another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an externally input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display device 100, received broadcast content, and externally input content. The content includes at least one of a broadcast image, an externally input image, an audio file, a still image, a Web page, or a text file.

Upon receipt of a return-to-home screen input, the controller 170 may control display of the home screen on the display 180.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display device. The card objects may further include at least one of a card object representing a list of connected external devices or a card object representing a call-associated list.

The home screen may further include an application menu including at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The size of the broadcast image may be set to a fixed size.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of the display 180.

Upon receipt of an incoming call at a connected external device or the image display device 100, the controller 170 may control focusing-on or shift of a call-related card object among the plurality of card objects.

If an application view menu item is selected, the controller 170 may control display of applications or a list of applications that are present in the image display device 100 or downloadable from an external network.

The controller 170 may control installation and execution of an application downloaded from the external network along with various UIs. Also, the controller 170 may control display of an image related to the executed application on the display 180, upon user selection.

Although not shown, the image display device 100 may further include a channel browsing processor for generating thumbnail images corresponding to channel signals or externally input signals.

The channel browsing processor may receive the TS output from the demodulator 120 or the TS output from the external device interface 135, extract images of the received TS and generate thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touchscreen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display device 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The image display device 100 may further include the camera unit (not shown) for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display device 100.

Particularly, the power supply 190 may supply power to the controller 170 which may be implemented as a System On Chip (SOC), the display 180 for displaying an image, and the audio output unit 185 for audio output.

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, Ultra Wideband (UWB) and ZigBee.

In addition, the remote controller 200 may receive a video signal, an audio signal or a data signal from the user input interface 150 and output the received signals visually, audibly or as vibrations.

The above-described image display device 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display device 100 illustrated in FIG. 1 is purely exemplary. Depending upon the specifications of the image display device 100 in actual implementation, the components of the image display device 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Unlike the configuration illustrated in FIG. 1, the image display device 100 may be configured so as to receive and play back video content through the network interface 130 or the external device interface 135, without the tuner 110 and the demodulator 120 shown in FIG. 1.

Figure 2:
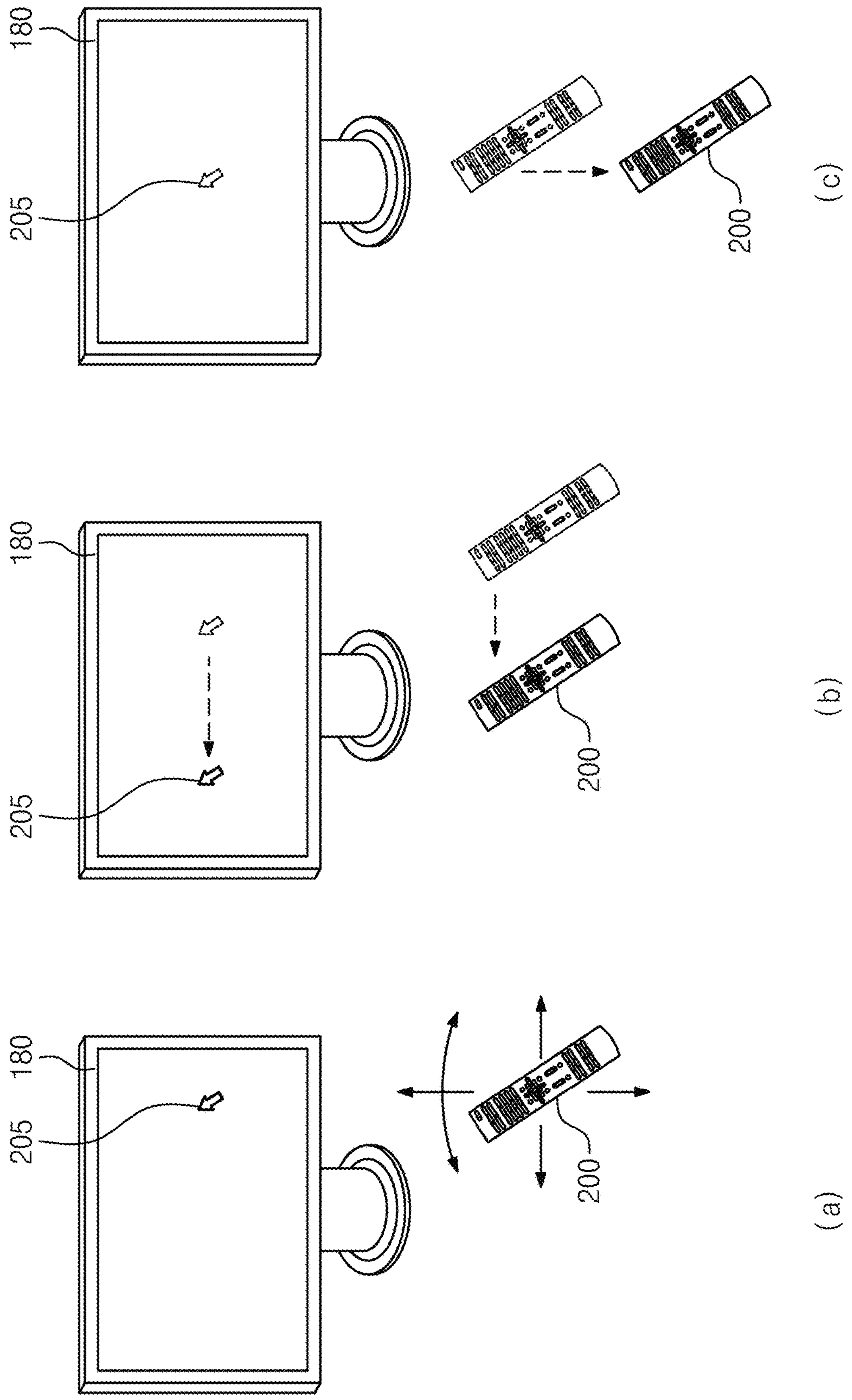
FIG. 2 is a view illustrating a control method of a remote controller that controls an image display device according to one aspect of the present disclosure.

FIG. 2 is a view illustrating a control method of a remote controller that controls an image display device according to one aspect of the present disclosure.

FIG. 2(*a*) illustrates a pointer 205 representing movement of the remote controller 200 displayed on the display 180.

The user may move or rotate the remote controller 200 up and down, side to side (FIG. 2(*b*)), and back and forth (FIG. 2(*c*)). The pointer 205 displayed on the display 180 of the image display device moves according to the movement of the remote controller 200. Since the pointer 205 moves in accordance with the movement of the remote controller 200 in a 3D space as shown in FIG. 2, the remote controller 200 may be referred to as a pointing device.

Referring to FIG. 2(*b*), if the user moves the remote controller 200 to the left, the pointer 205 moves to the left on the display 180.

A sensor of the remote controller 200 detects movement of the remote controller 200 and transmits motion information of the remote controller 200 to the image display device. Then, the image display device calculates the coordinates of the pointer 205 from the motion information of the remote controller 200. The image display device then displays the pointer 205 at the calculated coordinates.

Referring to FIG. 13(*c*), while pressing a predetermined button of the remote controller 200, the user moves the remote controller 200 away from the display 180. Then, a selected area corresponding to the pointer 205 may be zoomed in on and enlarged on the display 180. On the contrary, if the user moves the remote controller 200 toward the display 180, the selected area corresponding to the pointer 205 is zoomed out and thus contracted on the display 180. On the contrary, when the remote controller 200 moves away from the display 180, the selected area may be zoomed out and when the remote controller 200 approaches the display 180, the selected area may be zoomed in.

With the predetermined button of the remote controller 200 pressed, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The movement speed and direction of the pointer 205 may correspond to the movement speed and direction of the remote controller 200.

The pointer of the present specification is an object displayed on the display 180 in correspondence with the movement of the remote controller 200. Therefore, the pointer 205 may have various shapes other than the arrow illustrated in FIG. 13. For example, the pointer 205 may be a dot, a cursor, a prompt, a thick outline, etc. The pointer 205 may be displayed across a plurality of points, such as a line and a surface, as well as at a single point on horizontal and vertical axes.

Figure 3:
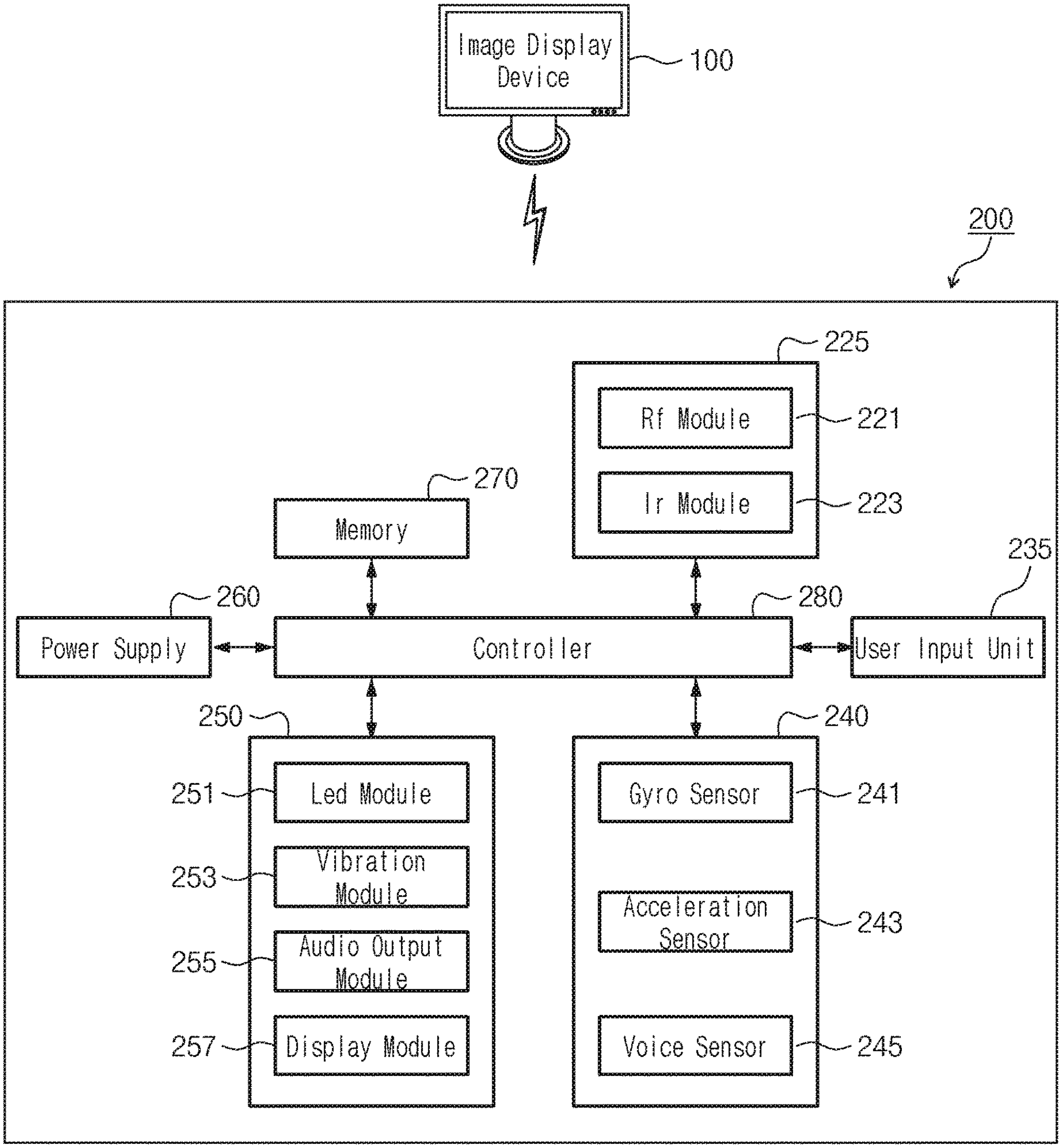
FIG. 3 is a block diagram of a remote controller that controls an image display device according to one aspect of the present disclosure.

FIG. 3 is a block diagram of a remote controller that controls an image display device according to one aspect of the present disclosure.

Referring to FIG. 3, the remote controller 200 may include a wireless communication module 225, a user input unit 235, a sensor unit 240, an output unit 250, a power supply 260, a memory 270, and a controller 280.

The wireless communication module 225 transmits signals to and/or receives signals from either of the above-described image display devices according to the embodiments of the present invention, that is, the image display device 100.

The remote controller 200 may include an RF module 1421 for transmitting RF signals to and/or receiving RF signals from the image display device 100 according to an RF communication standard. The remote controller 200 may also include an IR module 223 for transmitting IR signals to and/or receiving IR signals from the image display device 100 according to an IR communication standard.

In the present embodiment, the remote controller 200 transmits motion information representing movement of the remote controller 200 to the image display device 100 through the RF module 221.

The remote controller 200 may also receive signals from the image display device 100 through the RF module 221. As needed, the remote controller 200 may transmit commands such as a power on/off command, a channel switch command, or a volume change command to the image display device 100 through the IR module 223.

The user input unit 235 may include a keypad, a plurality of buttons, a touchpad and/or a touchscreen. The user may enter commands associated with the image display device 100 to the remote controller 200 by manipulating the user input unit 235. If the user input unit 235 includes a plurality of hard buttons, the user may input various commands associated with the image display device 100 to the remote controller 200 by pressing the hard buttons. Alternatively or additionally, if the user input unit 235 includes a touchscreen displaying a plurality of soft keys, the user may input various commands associated with the image display device 100 to the remote controller 200 by touching the soft keys. The user input unit 235 may also include various input tools other than those set forth herein, such as a scroll key and/or a jog wheel.

The user input unit 235 may include a microphone for receiving an audio signal, such as a user's voice. Voice data collected by the user input unit 235 may be analyzed and processed as a user's control command.

The sensor unit 240 may include a gyro sensor 241 and/or an acceleration sensor 243.

The gyro sensor 241 may sense movement of the remote controller 200.

For example, the gyro sensor 241 may sense movement of the remote controller 200 in X, Y, and Z-axis directions. The acceleration sensor 243 may sense the speed of the remote controller 200. The sensor unit 240 may further include a distance sensor for sensing the distance between the remote controller 200 and the display device 100.

The output unit 250 may output a video and/or audio signal corresponding to manipulation of the user input unit 235 or corresponding to a signal received from the image display device 100. The user may easily identify whether the user input unit 235 has been manipulated or whether the image display device 100 has been controlled, based on the video and/or audio signal output by the output unit 250.

The output unit 250 may include a Light Emitting Diode (LED) module 251 which is turned on or off whenever the user input unit 235 is manipulated or whenever a signal is received from or transmitted to the image display device 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 remains stationary for a predetermined time or longer, the power supply 260 may, for example, reduce or shut off supply of power to the spatial remote controller 200 in order to save power. The power supply 260 may resume power supply if a predetermined key of the remote controller 200 is manipulated.

The memory 270 may store various types of programs and application data necessary to control or drive the remote controller 200. The remote controller 200 may wirelessly transmit signals to and/or receive signals from the image display device 100 over a predetermined frequency band with the aid of the RF module 221. The controller 280 of the remote controller 200 may store information regarding the frequency band used for the remote controller 200 to wirelessly transmit signals to and/or wirelessly receive signals from the paired image display device 100 in the memory 270, for later use.

The controller 280 provides overall control to the remote controller 200. The controller 280 may transmit a signal corresponding to a key manipulation detected from the user input unit 235 or a signal corresponding to motion of the remote controller 200, as sensed by the sensor unit 240, to the image display device 100.

In one example, the sensor unit 240 may further include a voice sensor 245 (e.g., a microphone) for receiving the user's voice. The user's voice input via the voice sensor 245 may be transmitted to the image display device 100 via the wireless communication module 225.

Figure 4:
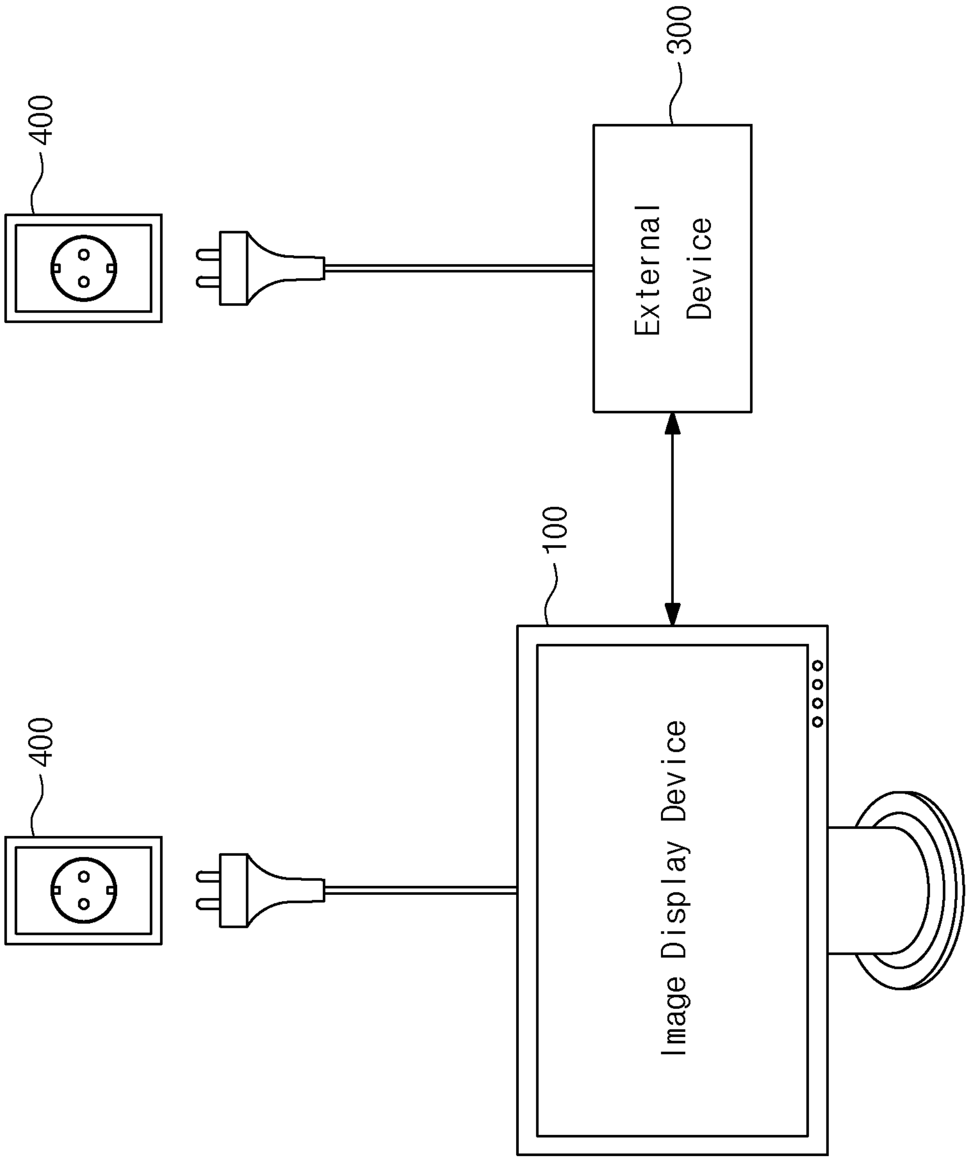
FIG. 4 illustrates an example in which an image display device is in wired or wireless communication with an external device that provides an image source according to one aspect of the present disclosure.

Hereinafter, referring to FIG. 4, connection of the image display device 100 to an external device 300 that provides an image source will be described. FIG. 4 illustrates an example in which an image display device is in wired or wireless communication with an external device that provides an image source according to one aspect of the present disclosure.

The image display device 100 may be in communication with the external device 300 that provides the image source. The communication therebetween may be a wired communication or a wireless communication connection. Wired communication methods may include, but may not be limited to, a high definition multimedia interface (HDMI) method or a displayport (DP) method. Wireless communication method may include, but may not be limited to, a Wi-Fi communication method.

Therefore, the external device 300 may provide the image source to the image display device 100 via the communication.

In one example, the image display device 100 and the external device 300 may be connected to a power outlet 400 for supply of alternating current (AC) power. When the alternating current (AC) power is supplied, the image display device 100 may perform control of direct current (DC) power.

Hereinafter, concepts of 'AC power on', 'AC power off', 'DC power on', 'DC power off', and 'DC background power on' used in the present disclosure will be defined.

A state in which the image display device 100 (or the external device 300) is connected to the power outlet 400 and the AC power is supplied to the image display device 100 (or the external device 300) is referred to as the 'AC power on'. A state in which the image display device 100 (or the external device 300) is put into a standby state as the AC power is supplied to the power supply 190 of the image display device 100 (or a power supply (not shown) of the external device 300) may also be understood as the 'AC power on'.

A state in which the image display device 100 (or the external device 300) is not connected to the power outlet 400 or the AC power is not able to be supplied to the image display device 100 (or the external device 300) because of reasons such as a power outage is referred to as the 'AC power off'.

A state in which the image display device 100 (or the external device 300) is turned on via manipulation of the remote controller 200 or a power button (not shown) in the AC power on state is referred to as the 'DC power on'. The DC power on may also be referred to as a hot state.

A state in which the image display device 100 (or the external device 300) is turned off via user's manipulation of the remote controller 200 or the power button (not shown) in the AC power on state is referred to as the 'DC power off'. The DC power off may also be referred to as a cold state or a standby state.

A state in which the image display device 100 (or the external device 300) is automatically turned on in a background to perform operations such as internal memory cleanup, OLED element compensation, and broadcast schedule update even when the remote controller 200 or the power button (not shown) is not manipulated in the AC power on state is referred to as the 'DC background power on'. The DC background power on may also be referred to as a warm state. In the warm state, the display 180 is not turned on, so that the user may not recognize the DC background power on state merely by looking at the display 180.

The DC background power on may also be understood as background booting. In the case of background booting, when the aforementioned operations such as the internal memory cleanup, the OLED element compensation, and the broadcast schedule update are completed, the image display device 100 may be in the DC power off state again.

Figure 5:
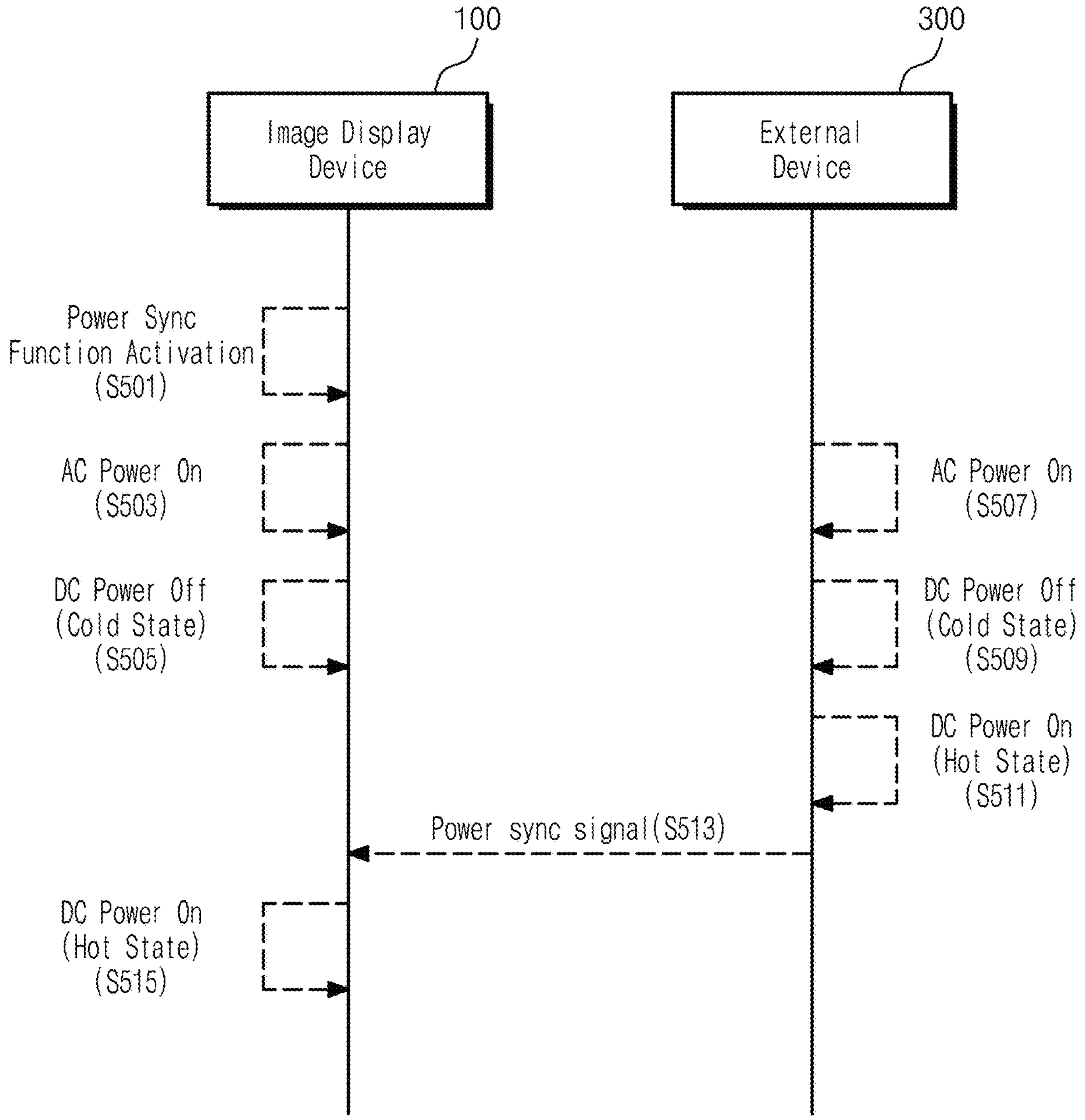
FIGS. 5 to 7 are flowcharts for controlling DC power of an image display device according to one aspect of the present disclosure.

Hereinafter, with reference to FIG. 5, a method for turning on the DC power of the image display device 100 using the external device 300 will be described. FIG. 5 is a flowchart for controlling DC power of an image display device according to one aspect of the present disclosure.

Hereinafter, it is assumed that the communication between the image display device 100 and the external device 300 is established as described in FIG. 4.

The image display device 100 may activate a power sync function [S501]. Here, the power sync function refers to a function of turning on the DC power in response to a control signal received from the external device 300 that is in communication with the image display device 100. When the communication between the image display device 100 and the external device 300 uses the HDMI method, the power sync function may be referred to as a sync power on function among consumer electronic control (CEC) functions.

The power sync function may be activated by default when the image display device 100 is shipped from a factory, or may be activated by a user's manual setting via a setting menu after the shipment from the factory.

The image display device 100 may have the AC power turned on, but the DC power turned off [S503 and S505].

The external device 300 may also have the AC power turned on, but the DC power turned off [S507 and S509].

There is no limitation on a temporal order relationship between steps S503 and S505 and steps S507 and S509. Steps S507 and S509 may be executed after execution of steps S503 and S505, or vice versa. The execution of steps S503 and S505 and the execution of steps S507 and S509 may be substantially concurrent.

The DC power of the external device 300 may be turned on [S511]. The turning on of the DC power may be performed, for example, by a user's manual manipulation of the external device 300.

The external device 300 may transmit a first control signal to the image display device 100 via the communication as the DC power is turned on [S513]. Hereinafter, the first control signal will be referred to as a power sync signal. When the communication between the image display device 100 and the external device 300 uses the HDMI method, the power sync signal may also be referred to as a consumer electronic control (CEC) signal.

The image display device 100 may automatically turn on the DC power in response to the reception of the first control signal [S515].

Figure 6:
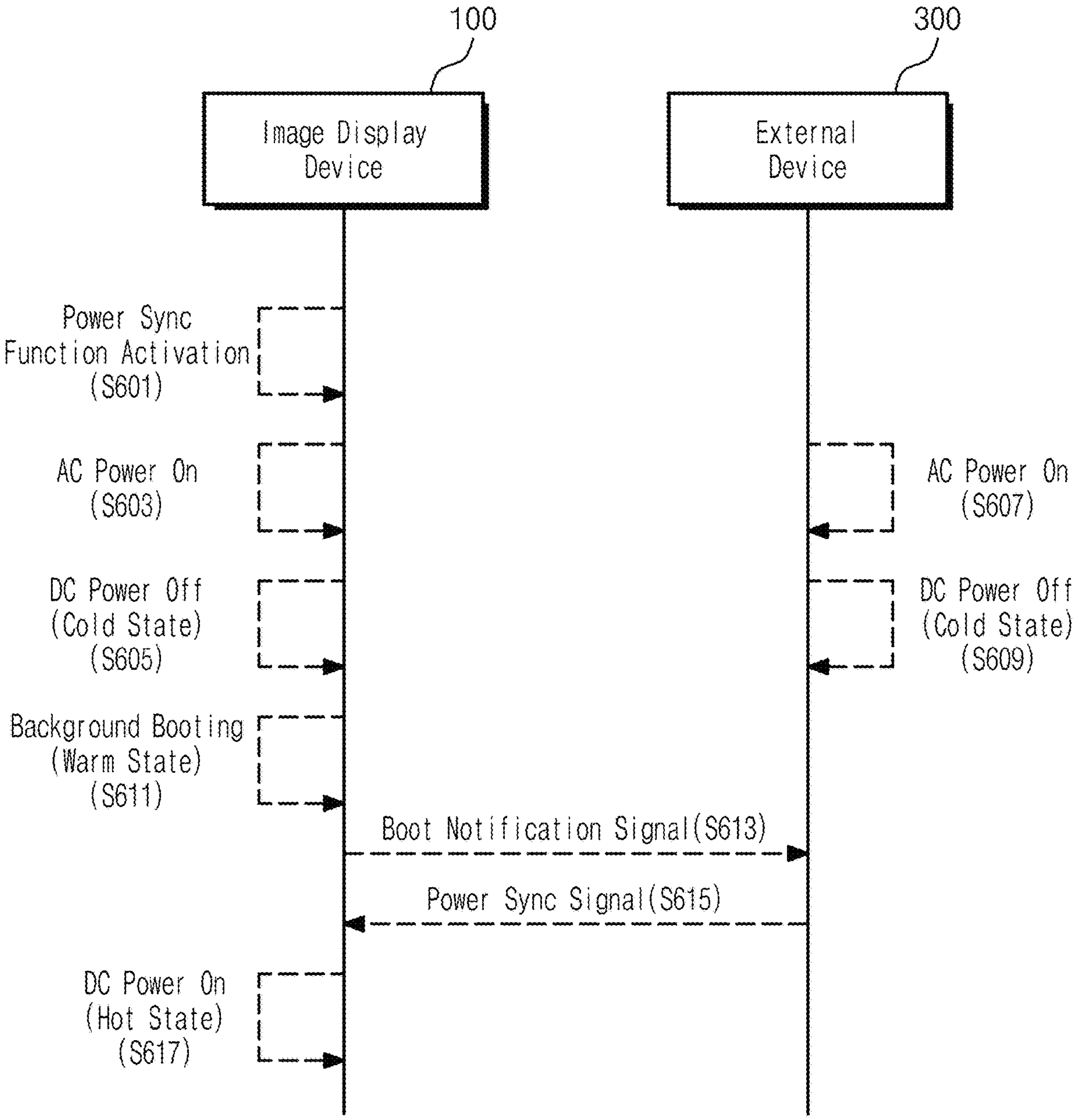

However, when the image display device 100 is constructed as described in FIG. 5, the DC power of the image display device 100 may be automatically turned on unnecessarily in some cases. An example of the DC power of the image display device 100 being automatically turned on unnecessarily will be further described with reference to FIG. 6. FIG. 6 is a flowchart for controlling DC power of an image display device according to one aspect of the present disclosure.

The image display device 100 may activate the power sync function [S601].

The image display device 100 may have the AC power turned on, but the DC power turned off [S603 and S605].

The external device 300 may also have the AC power turned on, but the DC power turned off [S607 and S609].

Steps S601 to S609 are the same as steps S501 to S509 described above, so that detailed descriptions thereof will be omitted.

The image display device 100 may have the DC background power turned on [S611]. The DC background power may be turned on periodically or aperiodically when a predetermined event occurs.

The image display device 100 may transmit a second control signal to the external device 300 via the communication as the DC background power is turned on [S613]. Hereinafter, the second control signal will be referred to as a boot notification signal. When the communication between the image display device 100 and the external device 300 uses the HDMI method, the boot notification signal may also be referred to as a hot plug detect (HPD) signal.

The external device 300 may transmit the first control signal to the image display device 100 via the communication in response to the reception of the second control signal [S615].

A controller 179 of the image display device 100 may automatically turn on the DC power in response to the reception of the first control signal [S617].

As such, even though the image display device 100 is only booted in the background, the DC power may be automatically turned on, which may cause inconvenience to the user.

Figure 7:
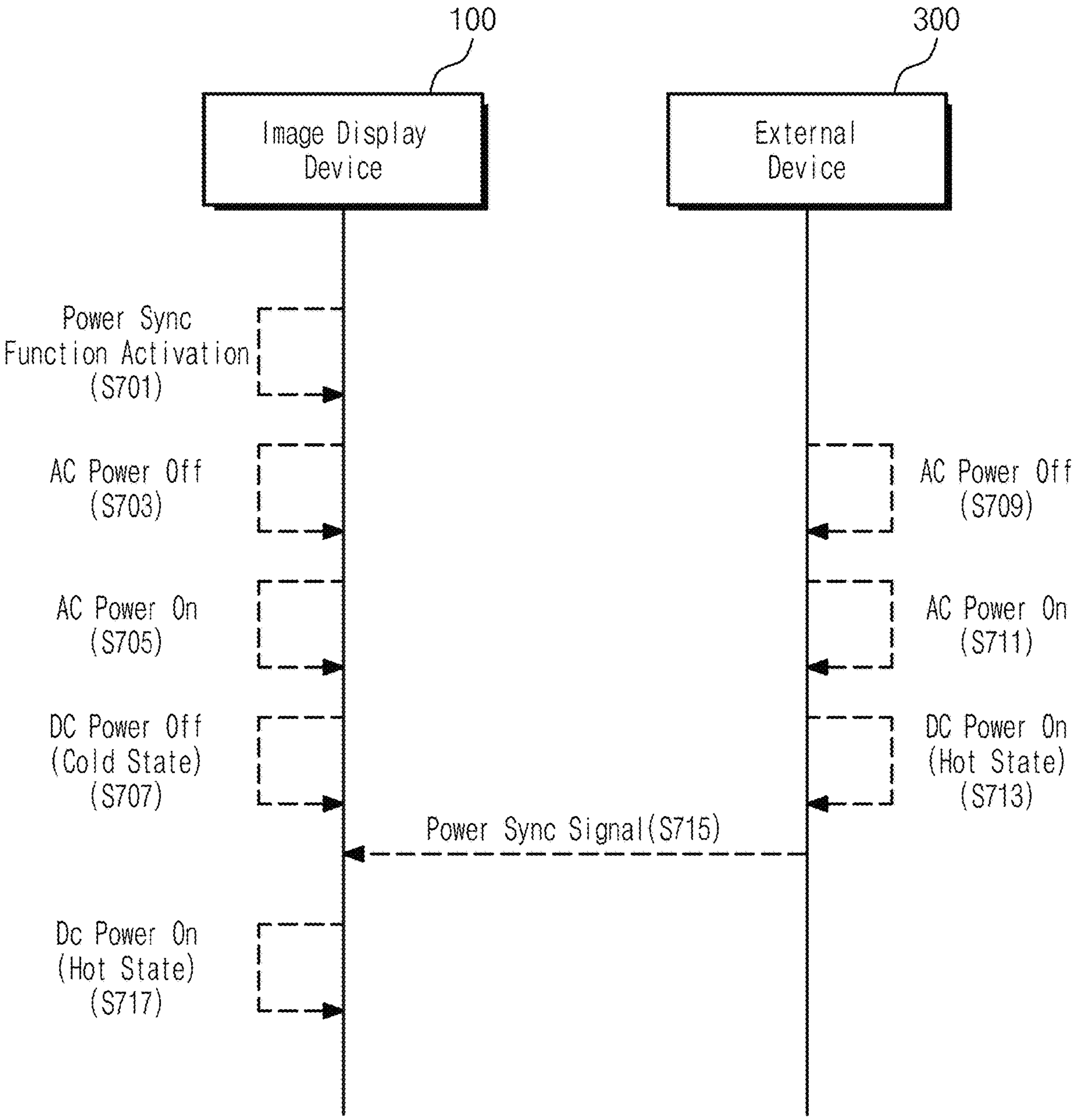

Hereinafter, another example in which the DC power of the image display device 100 is automatically turned on unnecessarily will be described with further reference to FIG. 7. FIG. 7 is a flowchart for controlling DC power of an image display device according to one aspect of the present disclosure.

The power sync function of the image display device 100 may be activated [S701].

The AC power of the image display device 100 may be turned off and then turned on [S703 and S705].

Even when the AC power of the image display device 100 is turned off and then turned on, the DC power of the image display device 100 may be turned off [S707]. That is, the image display device 100 may be in the cold state.

In one example, the AC power of the external device 300 may be turned off and then turned on [S709 and S711].

When the AC power of the external device 300 is turned off and then turned on, the DC power of the external device 300 may be turned on [S713]. That is, the external device 300 may be in the hot state.

The external device 300 may transmit the first control signal to the image display device 100 via the communication as the DC power is turned on [S715].

The image display device 100 may automatically turn on the DC power in response to the reception of the first control signal [S717].

As such, even though only the AC power of the external device 300 is turned on, the DB power of the image display device 100 may be automatically turned on, which may cause inconvenience to the user.

Figure 8:
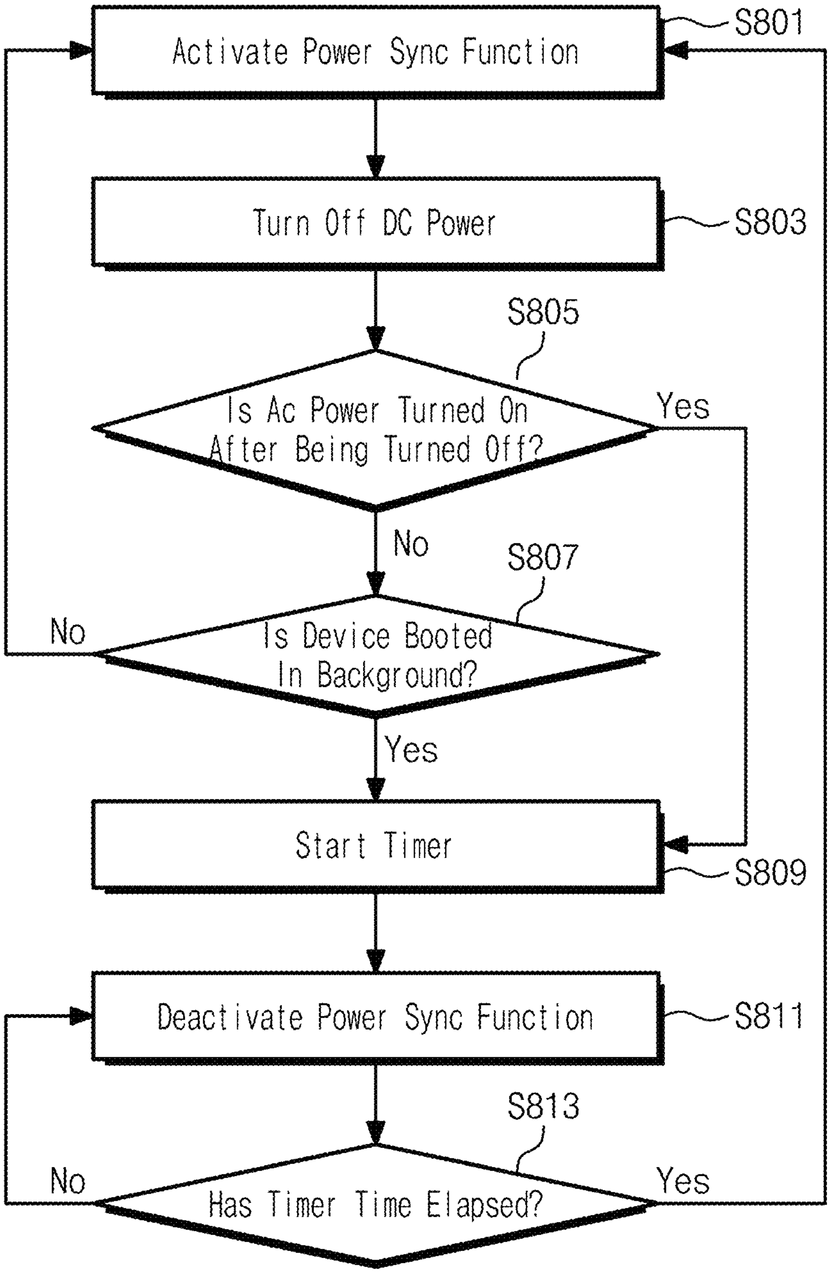
FIG. 8 is a flowchart for controlling activation and deactivation of a power sync function of an image display device according to one aspect of the present disclosure.

A method for resolving the inconveniences described above in FIGS. 6 and 7 will be described with further reference to FIG. 8. FIG. 8 is a flowchart for controlling activation and deactivation of a power sync function of an image display device according to one aspect of the present disclosure.

The controller 170 of the image display device 100 may control the power sync function to be activated [S801]. As described above, the power sync function may be activated by default from the time of the shipment from the factory, or may be activated by the user's manual setting via the setting menu of the image display device 100 after the shipment from the factory.

The DC power of the image display device 100 may be turned off [S803].

The controller 170 may sense whether the AC power of the image display device 100 is turned off and then turned on [S805].

When the AC power of the image display device 100 is not turned off and then turned on, the controller 170 may determine whether the DC background power of the image display device 100 is turned on [S807].

There is no limitation on a temporal order relationship between steps S805 and S807. Step S805 may be executed after step S807 is executed.

When the AC power of the image display device 100 is not turned off and then turned on and the DC background power of the image display device 100 is not turned on, the controller 170 may control the DC power of the image display device 100 to be turned off such that the power sync function remains activated in the image display device 100 [S801 and S803].

When the turning off and then the turning on of the AC power of the image display device 100 is sensed, or when the DC background power of the image display device 100 is determined to be turned on, the controller 170 may operate a timer to count whether a predetermined time (e.g., 10 seconds) has elapsed from a time point (a reference time point) of the sensing or the determination [S809].

Then, the controller 170 may control the power sync function to be deactivated until the predetermined time elapses [S811 and S813].

The controller 170 may control the power sync function to be reactivated after the predetermined time elapses [S813 and S801].

Figure 9:
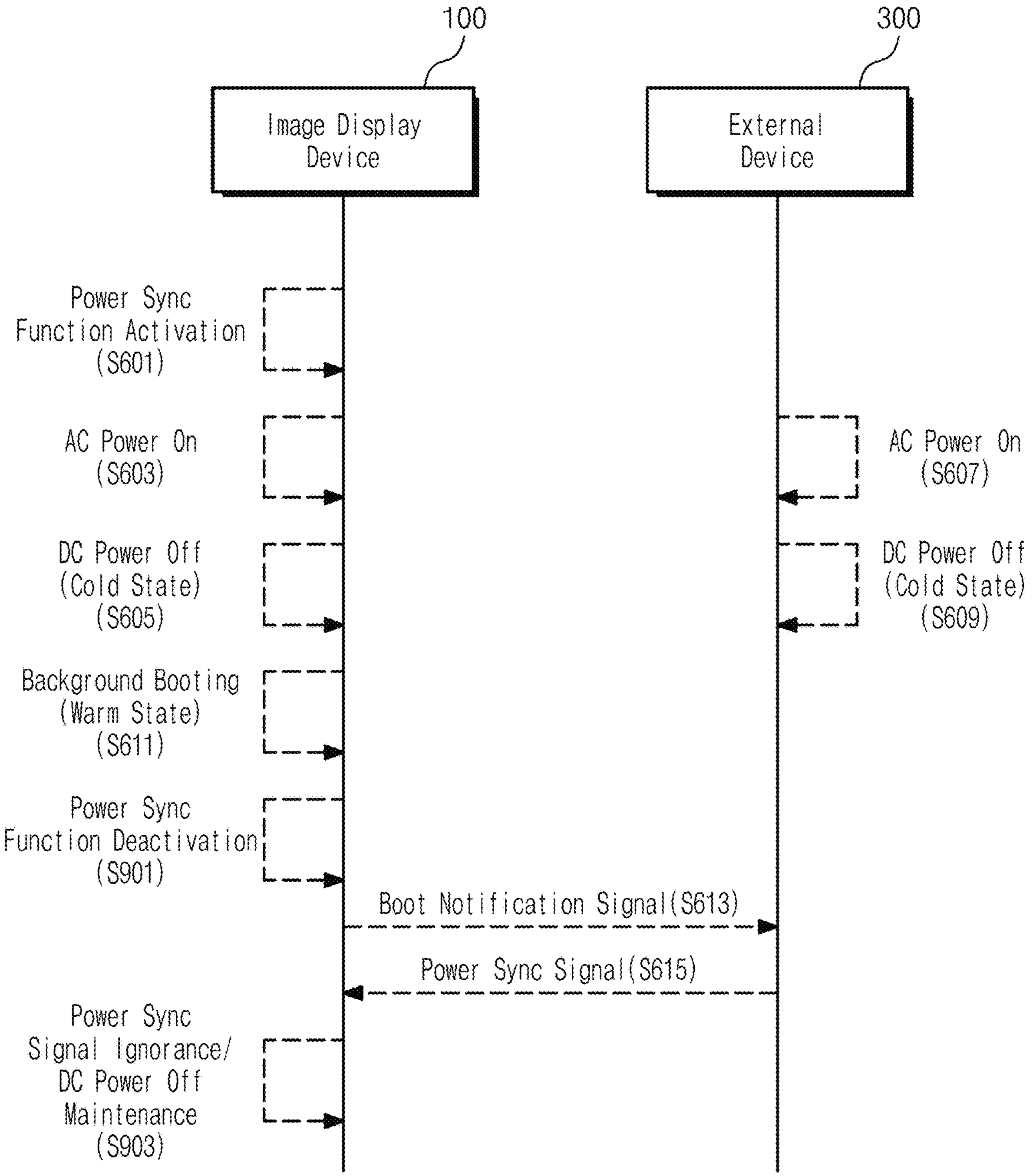
FIG. 9 is a modified flowchart of FIG. 6.

Hereinafter, with reference to FIG. 9, an example of modifying the DC power control process of the image display device in FIG. 6 to reflect the power sync function activation and deactivation process in FIG. 8 will be described. FIG. 9 is a modified flowchart of FIG. 6.

The image display device 100 may activate the power sync function [S601].

The image display device 100 may have the AC power turned on, but the DC power turned off [S603 and S605].

The external device 300 may also have the AC power turned on, but the DC power turned off [S607 and S609].

The image display device 100 may have the DC background power turned on [S611].

The controller 170 of the image display device 100 may control the power sync function to be deactivated until a predetermined time elapses from a time point when the DC background power is turned on [S901].

The image display device 100 may transmit the second control signal to the external device 300 via the communication as the DC background power is turned on [S613].

There is no limitation on a temporal order relationship between steps S901 and S613. For example, step S901 may be executed after execution of the step S613, or steps S901 and S613 may be substantially concurrent.

The external device 300 may transmit the first control signal to the image display device 100 via the communication in response to the reception of the second control signal [S615].

The controller 170 of the image display device 100 may control the DC power to remain off by ignoring the first control signal when the predetermined time has not elapsed even when the first control signal is received [S903].

Figure 10:
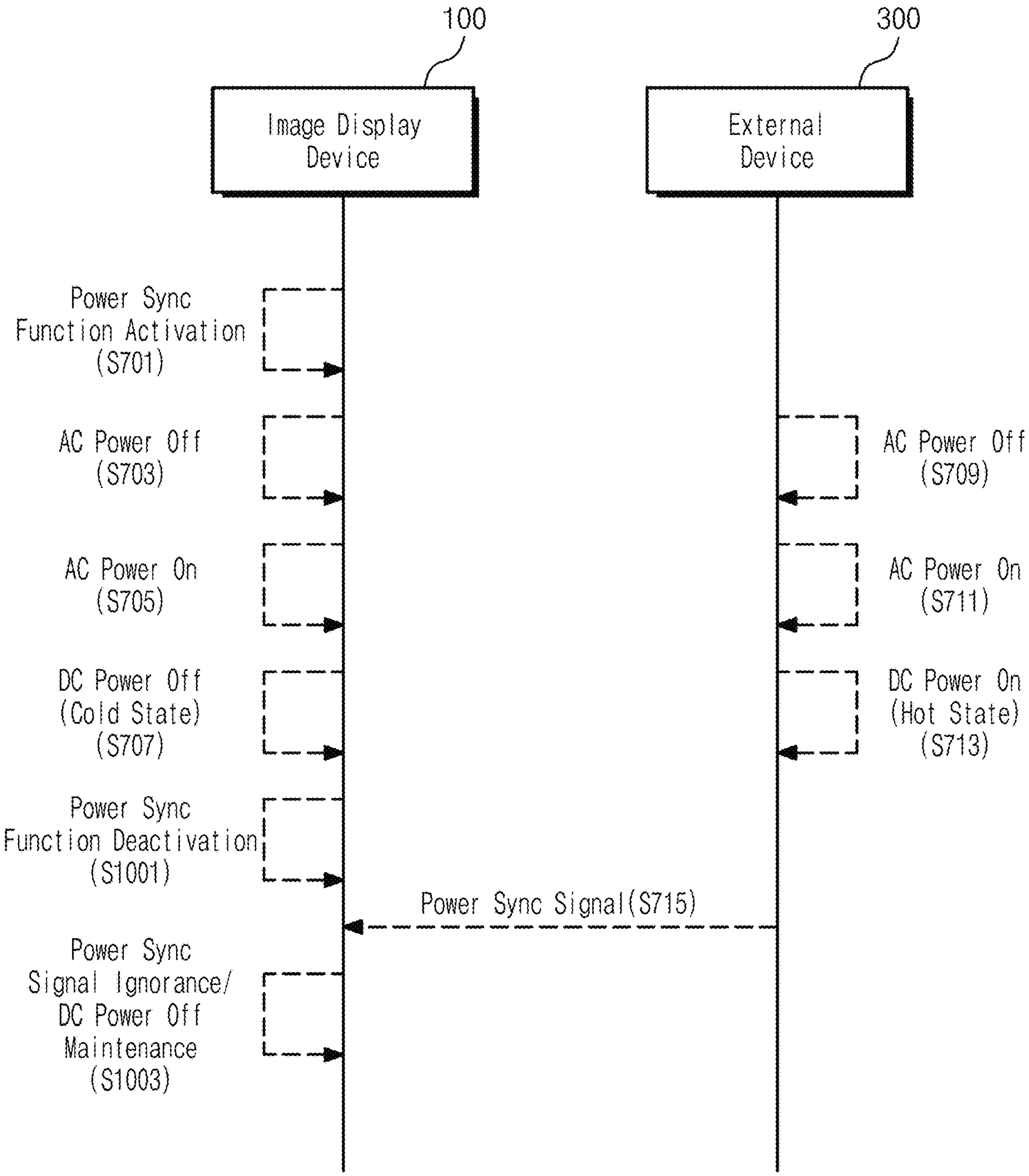
FIG. 10 is a modified flowchart of FIG. 7.

Hereinafter, with reference to FIG. 10, an example of modifying the DC power control process of the image display device in FIG. 7 to reflect the power sync function activation and deactivation process in FIG. 8 will be described. FIG. 10 is a modified flowchart of FIG. 7.

The power sync function of the image display device 100 may be activated [S701].

The AC power of the image display device 100 may be turned off and then turned on [S703 and S705].

Even when the AC power of the image display device 100 is turned off and then turned on, the DC power of the image display device 100 may be turned off [S707]. That is, the image display device 100 may be in the cold state.

The controller 170 of the image display device 100 may control the power sync function to be deactivated until a predetermined time elapses from a time point when the AC power is turned off and then turned on (or a time point when the AC power is turned on and the device enters the cold state) [S1001].

In one example, the AC power of the external device 300 may be turned off and then turned on [S709 and S711].

When the AC power of the external device 300 is turned off and then turned on, the DC power of the external device 300 may be turned on [S713]. That is, the external device 300 may be in the hot state.

The external device 300 may transmit the first control signal to the image display device 100 via the communication as the DC power is turned on [S715].

The controller 170 of the image display device 100 may control the DC power to remain off by ignoring the first control signal when the predetermined time has not elapsed even when the first control signal is received [S1003].

The present disclosure described above may be implemented as a computer-readable code on a medium in which a program is recorded. The computer-readable medium includes all types of recording devices in which data that may be read by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like, and also include those implemented in a form of a carrier wave (e.g., transmission via the Internet). In addition, the computer may include the controller 170 of the image display device and the controller 280 of the remote controller. Therefore, the detailed description above should not be construed as restrictive in all respects and should be considered exemplary. The scope of the present disclosure should be determined by a reasonable interpretation of the appended claims, and all changes within the equivalent scope of the present disclosure are included within the scope of the present disclosure. Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 170 of the mobile terminal and the controller 280 of the remote controller. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. An image display device comprising:

a power supply;

a communicator configured to be in communication with an external device; and a controller configured to determine whether to activate a power sync function based on whether a predetermined time has elapsed from one reference time point of a time point when alternating current (AC) power supply to the power supply is turned on and a time point when direct current (DC) background power is turned on.

2. The image display device of claim 1, wherein the controller is configured to:

control the power sync function to be deactivated until the predetermined time elapses from the reference time point; and control the power sync function to be activated after the predetermined time elapses from the reference time point.

3. The image display device of claim 2, wherein the controller is configured to control DC power of the image display device to be turned on in response to reception of a power sync signal from the external device while the power sync function is activated and the DC power of the image display device is turned off.

4. The image display device of claim 3, wherein the controller is configured to control a background boot notification signal to be transmitted to the external device in response to the DC background power being turned on.

5. The image display device of claim 4, wherein the communicator is in communication with the external device in a high definition multimedia interface (HDMI) standard.

6. The image display device of claim 5, wherein the power sync signal is a consumer electronic control (CEC) signal, and the background boot notification signal is a hot plug detect (HPD) signal.

7. The image display device of claim 2, wherein the controller is configured to control DC power of the image display device to remain off in response to reception of a power sync signal from the external device while the power sync function is deactivated and the DC power of the image display device is turned off.

8. The image display device of claim 1, wherein the DC background power is turned on for at least one of internal memory cleanup, OLED element compensation, and broadcast schedule update.

9. A method for controlling an image display device, the method comprising:

establishing communication with an external device; and determining whether to activate a power sync function based on whether a predetermined time has elapsed from one reference time point of a time point when alternating current (AC) power supply to a power supply is turned on and a time point when direct current (DC) background power is turned on.

10. The method of claim 9, further comprising:

deactivating the power sync function until the predetermined time elapses from the reference time point; and activating the power sync function after the predetermined time elapses from the reference time point.

* * * * *